United States Patent
Blackwell et al.

(10) Patent No.: US 8,078,742 B2
(45) Date of Patent: Dec. 13, 2011

(54) NETWORK ESTABLISHMENT AND MANAGEMENT PROTOCOL

(75) Inventors: Robin J. Blackwell, Redhill (GB); Neil A. Hankin, Smallfield (GB); Peter J. Lanigan, Croydon (GB); Nicoll B. Shepherd, Coulsdon (GB); Philip A. Rudland, Horley (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 769 days.

(21) Appl. No.: 10/523,377

(22) PCT Filed: Jul. 24, 2003

(86) PCT No.: PCT/IB03/03307
§ 371 (c)(1), (2), (4) Date: Feb. 1, 2005

(87) PCT Pub. No.: WO2004/015956
PCT Pub. Date: Feb. 19, 2004

(65) Prior Publication Data
US 2006/0026291 A1 Feb. 2, 2006

(30) Foreign Application Priority Data
Aug. 6, 2002 (GB) .................................. 0218174.1
Apr. 25, 2003 (GB) .................................. 0309401.8

(51) Int. Cl.
*G06F 15/16* (2006.01)
*G06F 15/173* (2006.01)
(52) U.S. Cl. ....................................... 709/230; 709/238
(58) Field of Classification Search .................. 709/202, 709/218, 318, 230; 704/9
See application file for complete search history.

(56) References Cited

U.S. PATENT DOCUMENTS

| | | | |
|---|---|---|---|
| 5,991,713 A * | 11/1999 | Unger et al. | 704/9 |
| 6,349,325 B1 * | 2/2002 | Newcombe et al. | 709/202 |
| 7,093,031 B2 * | 8/2006 | Ray et al. | 710/1 |
| 7,171,475 B2 * | 1/2007 | Weisman et al. | 709/227 |
| 7,603,408 B1 * | 10/2009 | McGinnis et al. | 709/203 |
| 7,684,438 B2 * | 3/2010 | Stephens et al. | 370/466 |
| 2002/0029256 A1 * | 3/2002 | Zintel et al. | 709/218 |
| 2003/0167369 A1 * | 9/2003 | Chen et al. | 710/306 |
| 2003/0185104 A1 * | 10/2003 | Goergen | 368/47 |
| 2006/0059003 A1 * | 3/2006 | Requena et al. | 705/1 |

FOREIGN PATENT DOCUMENTS
WO  9957837 A2  11/1999

OTHER PUBLICATIONS
Bruce Martin et al, "WAP Binary XML Content Format", Http://www.w3.org/1999/06/NOTE-wbxml-19990624, W3C Note Jun. 24, 1999, 25 pages.
Neel Sundaresan et al, "Algorithms and Programming Models for Efficient Rperesentation of XML for Internet Applications", Computer Networks, 39 (2002), pp. 681-697.
Hartmut et al, "XMILL: An Efficient Compressor for XML Data" Univ. of Pennsylvania, AT&T Labs, 2000, pp. 153-164.

* cited by examiner

*Primary Examiner* — Jeffrey Pwu
*Assistant Examiner* — Shaq Taha (57) ABSTRACT

The invention relates to a protocol for communications between networked devices. The devices are logically arranged as a hierarchy of device types including a controller device type (52) from which no other device type depends and a basic device type (54) from which a number of other device types depend. The devices implement a simple device description message of fixed length and format which includes the device type, and some devices further implement an extended device description message including additional information.

16 Claims, 8 Drawing Sheets

NETWORK ESTABLISHMENT AND MANAGEMENT PROTOCOL

This invention relates to a network protocol, and in particular to implementations of the protocol.

A prior art protocol for network management is universal plug and play (UPnP), which is very useful for internet applications where bandwidth, battery consumption, and to an extent cost, are not an issue. Implementations of the protocol in consumer electronics (CE) do exist, but because of the extent of the protocol, such implementations impose a heavy load especially on the simplest devices that otherwise would require only minimal processing capability.

The need therefore exists for a protocol suitable for embedding in simple devices such as lights, thermostats and CE equipment (remote control for TV's, DVD's and PVR's), that is simple and cost effective to implement, requires the minimum of bandwidth, yet is scalable across a range of devices with varying capabilities.

This need is not restricted to wireless application, but extends to wired applications.

According to a first aspect of the invention there is provided a system, comprising: a plurality of networked devices each having a transceiver for sending and receiving network messages; at least one networked device arranged to send a simple device query message to other devices and to receive and interpret simple device description messages subsequently received from the other devices; at least one networked device arranged to send an extended device query message to other devices and to receive and interpret extended device description messages subsequently received from the other devices; each of the networked devices being arranged to respond to an incoming simple device query message from another of the devices by sending a simple device description message of defined length including a device type value representing the type of the device; and at least one of the networked devices is arranged to respond to an incoming extended device query message from another of the devices by sending an extended device description message.

Such a system implements the protocol that is the subject of this patent application. The protocol itself will be referred to as home uniform control language (HUCL).

In comparison, those prior art systems of which the inventors are aware implement only a single device description message and response. By providing a simple device description of defined length and an extended device description of variable length the invention makes it possible to combine using the HUCL protocol simple devices operating only using the simple messages and complex devices which make use of the greater functionality available from the extended device description of variable length. Simple devices may simply ignore extended device description queries.

The Simple Device Description includes a small or moderate number of predetermined fields each field being of fixed length. In general, the same fields will be used for each message, although there may be some variation. For example, a composite device may include an additional integer field including the number of sub-devices as explained below.

Preferably, the simple device description message is in the form of a token-compressed message compressed from a human-readable message format, the message including a device type value representing the type of the other device; the device type value being selected from a device type hierarchy having predetermined top level elements including a controller device type and a basic device type, and at least one further level of subsidiary device types depending from the basic device type and inheriting properties of higher level device types on which the subsidiary device type depends, but not including any further level of subsidiary device types depending from the controller device type.

According to the preferred implementation of the HUCL protocol, the underlying message format is a human readable format, such as XML. However, to save bandwidth, messages are passed between networked devices in compressed form. A networked device is nevertheless able to process such compressed messages, because the compression method used is token compression, which replaces common strings with tokens. The networked device can thus recognise the compressed tokens without decompression, at least enough to recognise a query requiring a response of a simple device description, and then respond with a simple device description. Thus, a networked device can be implemented with little overhead.

A suitable form of token coding is described in "wap binary XML content format" of 24 Jun. 1999, available at the time of writing at http://www.w3.org/TR/wbxml.

It will be noted that although there is preferably at least one hierarchy depending from a basic device type, i.e. a hierarchy of controlled devices, there is no corresponding hierarchy of controller devices. This is to keep the simple device description messages as short and simple as possible—many controllers, such as a universal remote control, are capable of controlling a number of different device types.

Preferably, the plurality of networked devices include at least one simple device without the capability to decompress messages and accordingly which interprets directly compressed messages and at least one complex device including a message decompression arrangement for decompressing the messages and a message interpreter for interpreting the decompressed messages.

In another aspect, the invention relates to an individual networked device capable of responding to both simple and extended device description query message.

Accordingly, in a second aspect, there is provided a networked device including:
 a transceiver for sending and receiving messages: and
 a message handler arranged to carry out the steps of:
  on receiving a simple device description query message from one of the other devices, sending to the other device a simple device description message of defined length including a device type value representing the type of the networked device; and
  on receiving (an extended device description query message from another device sending to the other device an extended device description of variable length.

As well as networked devices capable of responding to such device query messages, the invention also relates to devices generating device query messages and processing the results.

Accordingly, in a third aspect there is provided a networked device, including a transceiver for sending and receiving messages:
 a message handler arranged to carry out the steps of:
 establishing the address of at least one other device;
 sending a simple device description query message to another device requesting a simple device description;
 receiving from the other device a simple device description message of fixed length including a device type value representing the type of the other device and a field indicating whether an extended device description is available;
 and further arranged to optionally carry out the steps of:
 testing the simple device description message to determine whether an extended device description is available;

sending an extended device description query message to the other device requesting an extended device description from the other device; and receiving from the other device an extended device description of variable length.

The invention also relates to the methods of operation of the devices of the second and third aspects.

Accordingly, in a fourth aspect, the invention relates to a method of operation of a networked device, including: sending a simple device description query message to one of the other devices requesting a simple device description; receiving from the other device a simple device description message of defined length including a device type value representing the type of the other device and a field indicating whether an extended device description is available; testing the simple device description message to determine whether an extended device description is available, and if so sending an extended device description query message to the other device requesting an extended device description from the other device; and receiving from the other device an extended device description of variable length.

In a fifth aspect, the invention relates to a method of operation of a networked device, including:

receiving a simple device description query message from one of the other devices requesting a simple device description;

sending to the other device a simple device description message of defined length including a device type value representing the type of the networked device;

receiving an extended device description query message from the other device requesting an extended device description from the networked device; and sending to the other device an extended device description of variable length.

As previously mentioned, the device type value may be selected from a device type hierarchy having predetermined top level elements including a controller device type and a basic device type, and at least one further level of subsidiary device types depending from the basic device type and inheriting properties of higher level device types on which the subsidiary device type depends, but not including any further level of subsidiary device types depending from the controller device type.

A controller device according to the invention preferably includes a control input, and controls other devices based on signals received on the control input. Further, the controller device may implement one or more ways of determining what devices the controller can control.

One approach to deal with the lack of information when a device is a controller device type is for the controller device to have the functionality to respond to an incoming controller query message querying whether the controller can control a predetermined device type by responding with the lowest level of device type in the list of device types that can be controlled by the networked device that either is the predetermined device type or is a higher level device type from which the predetermined device type depends. The controller device can then send control signals selected from a predetermined list of control signals to other devices in accordance with signals received on the control input.

Instead of being a controller device, the device may be a controlled device having a device type of the basic device type or a device type depending from the basic device type; the networked device having the capability of responding to basic device instructions sent by a controller, the instructions including at least a predetermined base set of instructions.

In order to cope with multifunctional devices, the predetermined top level elements may include a composite device type with the functionality of a predetermined number of other device types, and arranged to respond to an incoming device query message requiring a simple device description by sending a simple device description including the device type as a composite device and the instantaneous number of other device types.

The networked device may include a memory storing a predetermined simple device description message, wherein the description message is a message pre-compressed from a message in human readable form including a device type; a flag indicating if the sending device has an extended device description available; and a predetermined number of additional flags identifying a predetermined number of additional status settings. Thus, rather than generating a simple device description message internally, a suitable message is pre-stored and sent out when required.

The invention also relates to a computer program for controlling a networked device.

The system may include a number of simple devices, with simple functionality and no capability to decompress messages, and more complex devices that decompress messages to interpret them and operate on them. The more complex devices can have much more complex functionality, at the expense of increased overhead and processor power requirement.

In another aspect, the invention relates to a network establishment and management protocol for controlling electronic devices, the protocol being recorded on a record medium, the protocol comprising: a compression algorithm defining the mechanism for compression of said messages; a definition of a generic message format, the messages being XML compliant messages; and a definition of message sequencing requirements.

The protocol may define controller devices and discovery for controller devices may be defined to include a mechanism for discovering a controlling device and instructing said controlling device on its future operation.

The protocol may further define device description messages to be one of a first message of fixed length and content, and a second message of undefined length and content.

The protocol may define discovery of device description messages to allow piecemeal discovery of the second device description message.

The protocol may define composite devices and the device description messages of composite devices are defined to include the number of sub-devices in the composite.

Discovery of device description messages of composite devices may be defined to allow discovery of the sub-devices in turn.

For a better understanding of the invention, embodiments will now be described purely by way of example, with reference to the accompanying drawings in which.

The protocol HUCL is a lightweight, low bandwidth control protocol primarily designed for wireless systems. The messaging format is based on XML, and messages are compressed prior to transmission. The use of XML provides an extensible and scalable solution with the compression reducing the data sent, so reducing the amount of time the transmitter is on and consuming power.

The general principles of the HUCL protocol and how it would operate on a device will now be discussed with reference to a simple example.

Figure 1:
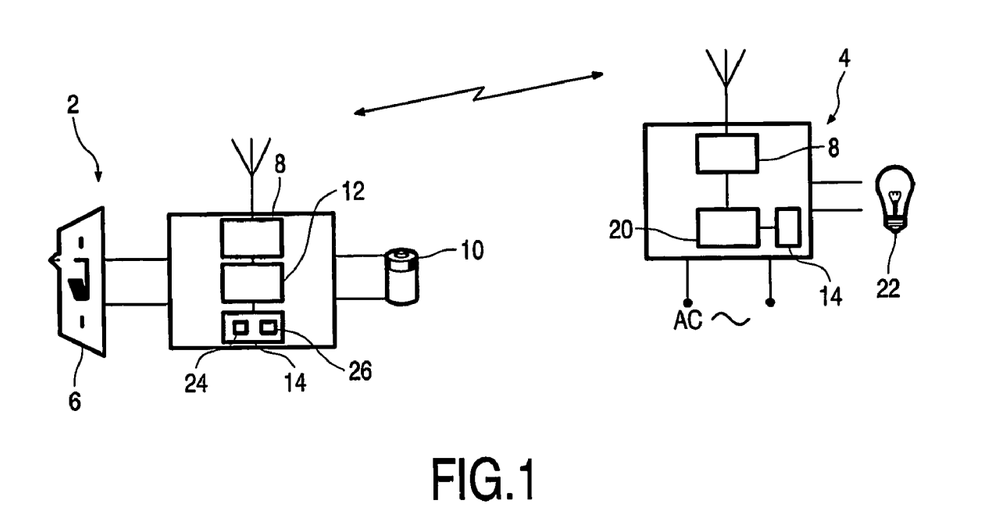
FIG. 1 shows a pair of devices communicating using an embodiment according to the invention.

Referring to FIG. 1, a light switch 2 and a light fitting 4 are provided. The light switch 2 has a physical rocker switch 6 operated by the user, together with an RF transceiver 8 and battery 10, together with control circuitry 12 and memory 14. The light fitting also has an RF transceiver 8 and memory 14, but is mains powered and has the control circuitry 20 to apply power to the light bulb 22. The light switch 2 is thus an example of a controller which has a control input 6 (the switch), whereas the light fitting is an example of a controlled device 4. The memory 14 in the controller includes a list 24 of device types that the controller can control, and control functions appertaining to the device types. The memory 14 in both controlled 4 and controller 2 devices also contains code 26 for causing the control circuitry to carry out the methods that will be described in more detail below.

Figure 2:
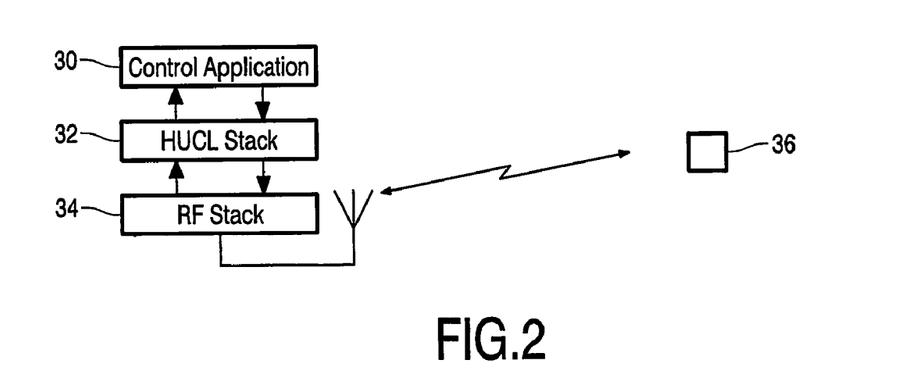
FIG. 2 shows a schematic of the software in one device.

FIG. 2 shows a representation of the software that resides on each of the devices in memory 14. The control application 30 communicates with the HUCL Software Stack 32 when certain events occur.

In a similar way the HUCL Software Stack 32 communicates with the RF Software Stack 34, and the RF Software Stack 34 will communicate back to the HUCL Software Stack 32 when certain events occur e.g. on receipt of data.

Messages 36 are sent and received. The messages may be of a number of types, including a simple device description query message, or any of a number of other message types.

Figure 3:
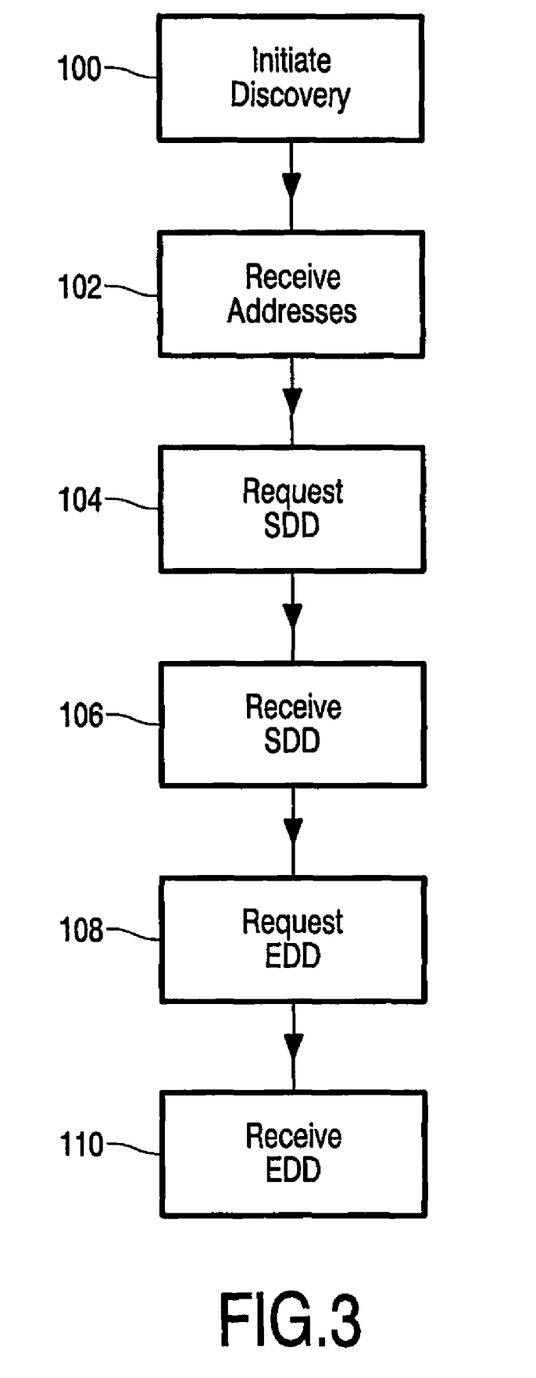
FIG. 3 is a flow diagram of the device discovery process.

The operation of the devices will now be described with reference to FIG. 3. The first phase in the operation of this pair of devices is for the switch to discover the address of the fitting. This is known as device discovery, and it is a requirement of the underlying RF transport stack that device discovery is either provided (in the RF Software Stack), or that it is possible to implement device discovery on top of the transport stack (in the lower layer of the HUCL Software Stack).

The discovery process is initiated 100 by the Control Application (possibly as a result of some user interaction) by performing a call into the HUCL Software Stack requesting firstly the number of known devices, and then the network addresses of those devices. These device addresses are returned.

Depending on the underlying RF protocol, the network addresses may be established in some other way.

The end result of the device discovery phase is that the Control Application is supplied 102 with a list of addresses of all devices known by the RF Stack. At this point in the process the Control Application knows nothing more about each other device other than its address.

The second phase in the pairing process is for the Control Application to gather information on the devices for which it has addresses. This information is called the device description. The control application does this by making a call into the HUCL Software Stack, passing the address of the device that it requires the device description from.

The request for the simple device description is then passed 104 over the RF link to the destination device, so in the switch/fitting example described above the request is transmitted from the switch to the fitting. On receiving the request, the HUCL Software Stack at the destination device makes a call in to the Control Application requesting the device description. The format of the description is defined. If not already in a compressed form the description is compressed before being transmitted back to the sender of the request.

When the HUCL Software Stack on the requesting device receives 106 the device description, it is passed up to the Control Application. At this point the application has some basic information about the device and can make the decision as to whether it wished to communicate further with this device.

A design goal of HUCL is that it is suitable to operate on very simple devices, however the information necessary to fully describing a device is potentially quite complex. The list below shows the sort of information a device might want to provide as part of its description.

Device Type e.g. DVD
Vendor Name e.g. Philips
Model Number e.g. DVD1010/002
Serial Number e.g. AH06848032345
Vendor URL e.g. www.philips.com For the simplest of control devices, such as the switch used in the example throughout this section, much of this information is probably redundant. It would however be of use on a higher end 'PDA' type remote control that has a screen where such information could be displayed to the user.

The processing of such descriptions on low-end devices can present a problem, since it would potentially need the storage (RAM) to cache the complete message as it was received. The problem is worse than it might at first seem, since the overall size of the description data shown above is indeterminate, much of the information is 'free text'; the vendor name could be very long, the URL could specify an exact page maybe even with parameters e.g. http://www.consumer.philips.com/global/b2c/ce/catalog/subcategory.jhtml?groupld=VIDEO&divld=0&catld=DVD&subCatld=DVDPLAYER The way in which this is overcome in HUCL is that the device description is split into two tiers of information. The first tier is a simplistic description of the device but identifying if further information is available. It does not contain any free text fields so the overall length of it is deterministic. The second tier of extended information is optional but provides additional information.

Figure 12:
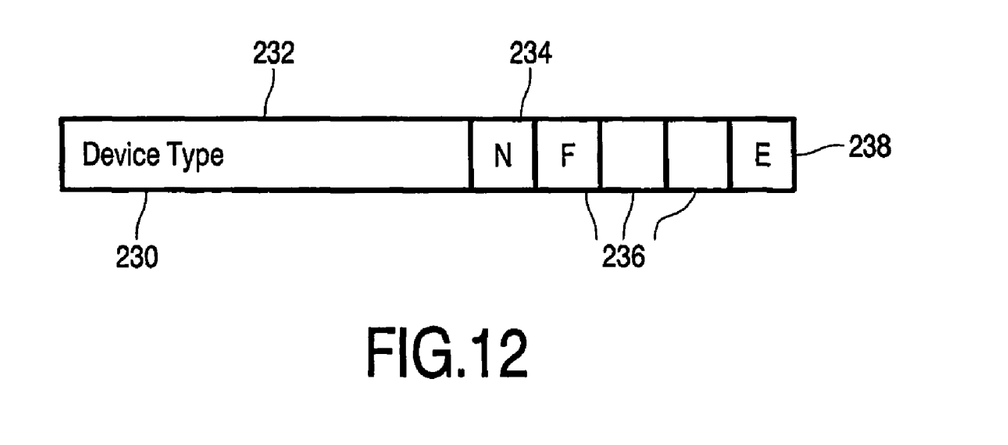
FIG. 12 illustrates a simple device description message.

Referring to FIG. 12, the Simple Device Description message 230 includes as fields the device type 232, a field 238 to indicate if Extended Device Description available and other fields 236 identifying key information e.g. a flag to indicate if event subscription is available. Optional integer field 234 represents the number of sub-devices of a composite device. The skilled person will appreciate that the message 230 may also include a header and footer which are omitted for simplicity. The message will include compressed XML tokens which are likewise omitted for clarity. The fields of the Simple Device Description are all of fixed length, so that they can be dealt with readily without decompression.

After receiving 106 (FIG. 3) the Simple Device Description 230 the Simple Device Description 230 is passed back to the HUCL Stack.

If the Extended Device Description is available and the controller device requires it, the controller device Control Application may issue a "GetExtendedDescription" request 108 back to the device.

The HUCL Stack on the device receiving this request makes a Get Extended Description call into the Control Application requesting the Extended Device Description.

The Extended Device Description is passed back to the HUCL Stack, and makes its way back to the Control Application on the device that requested it. The Extended Description is then returned 110 to the requesting device.

If a GetExtendedDescription query is received on a device that does not provide an Extended Device Description the request is simply ignored.

Returning again to the switch/fitting example used throughout this section, from the point when the switch knows only the address of the fitting, the switch requests from the fitting its Simple Device Description. On receiving this it provides sufficient information such that the switch knows that it is talking to a light fitting that conforms to the standard fitting command set, it also knows that (for example) the fitting can't provide any Extended Device Description.

It is mandatory for a device application to provide a Simple Device Description to the HUCL Stack when requested. A device that does not provide any Extended Device Description can ignore any requests it receives for such information.

Included in the Simple Device Description returned by a device (when requested) is the device type field 232 that identifies the type of the device, e.g. TV, DVD, Light Fitting etc. The Device Type field 232 will identify to the controller (requesting the Simple Device Description) the instruction set that the device conforms to. HUCL devices identify themselves simply by their type identifier, they do not then go on to send messages to describe how they are controlled; there is no 'runtime' service description concept in HUCL. If a device identifies itself as a light fitting then the command set that can be called on this device is identified in the HUCL specification for a Light Fitting type device.

Figure 4:
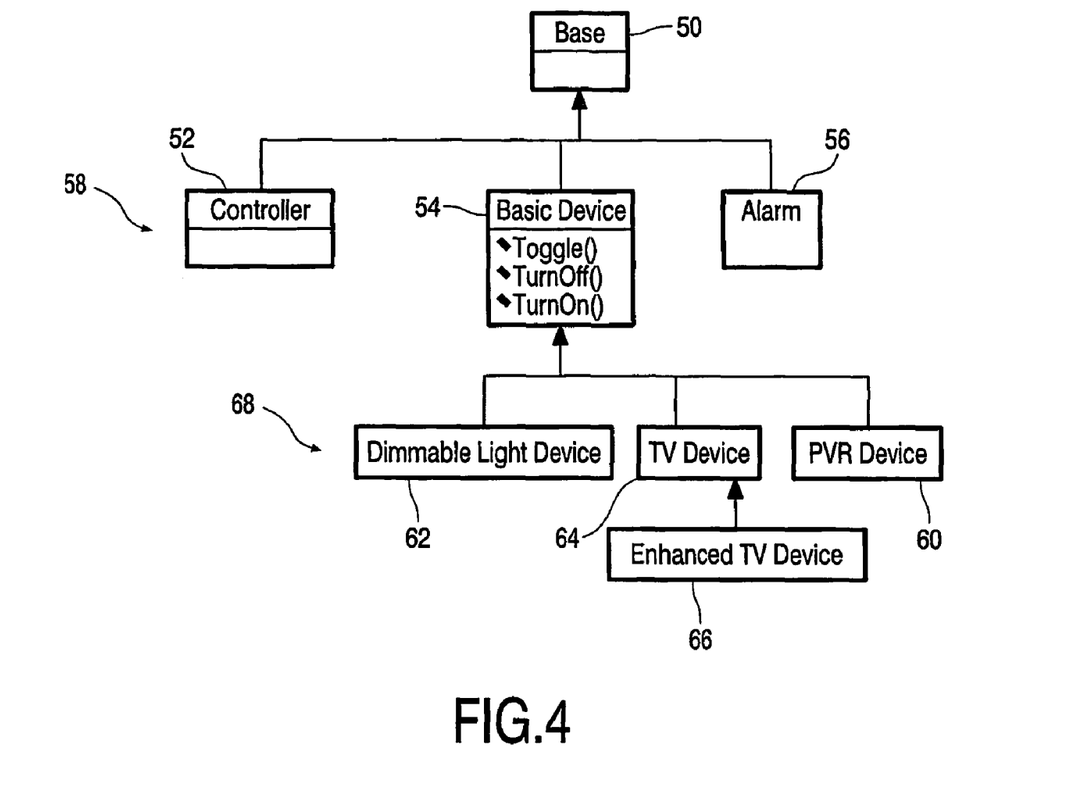
FIG. 4 is a schematic of the device type hierarchy.

Referring to FIG. 4, all device types depend from a base device type 50. Top level elements 58 include in this example the controller device type 52, a basic device type 54 for controlled devices and an alarm device type 56.

Subsidiary device types 68 depend from the basic device type. In the example, these include a TV device type 64, a dimmable light device type 62 and a PVR device 60.

The Device Type Classification was to produce a system aims to allow a simple controller to identify whether it could control a device to the extent of the controllers' capabilities.

A simple switch could be paired with a light fitting to turn on and off a light, but one might argue that the control functionality of the switch, that is its ability to turn a device on or off should be applicable to any device than can accept an on/off concept e.g. a TV, Heater, Printer.

One way in which this could be implemented is for the switch to have a list of all of the devices it knows how to control (turn On or Off), so when it requests the Simple Device Description for a device, it can look at the Device Type field in the returned description and determine if it is within its list of device types it knows how to control.

There are two significant drawbacks of this approach. Firstly the switch is a very simple device and it is undesirable for the application within it to have to hold a list of all possible devices that it could control, which would be quite large; secondly if a new type of device is created after the switch is produced (which can accept simple On Off functionality), then the switch will not have this new device type in its list, and will not believe it can control it i.e. it is not extensible.

HUCL classifies devices in a hierarchical way, shown in FIG. 4. The Device Type field 232 (FIG. 15) identifies the device within the hierarchy and so even if new devices were created, as long as it is derived from an the appropriate point within the hierarchy, a simple switch would still know that it could control it to an extent.

Devices that fall lower in the tree inherit the functionality of device types above it. It may be necessary to add some interpretation to the commands when applied to lower devices in the tree, for example the On/Off command when sent to a light will fairly obviously turn it On and Off, but the same commands when sent to a TV would place it in and out of standby mode.

The key benefit of the Device Type hierarchy is that even if the controller has no knowledge of the specific device type itself, it can determine the device from which it is derived, of which it may have some knowledge and hence may be able to control the device to some lesser extent (from the perspective of the device).

For example, consider the case that a light switch obtains the address of a device, it requests from this device the Simple Device Description; the Device Type field identifies the device as TV, but the switch does not recognise this as a device it knows about. However the switch can also establish from the description that it is a derivative of the 'Basic Device', which it does know about. The net result is that the switch can control the TV, to the extent of the controllers capabilities i.e. On and Off, despite knowing nothing about the device itself. The device could be a brand new category of device called an 'XYZ' invented long after the switch was manufactured, but so long as it is derived from a Basic Device the switch can still control it to an extent.

Although the Device Type Hierarchy may have just two tiers, and controller and basic device top level elements, at least one further tier and/or top level element is desirable. This caters for devices that would not comply with the functionality shown above in the Basic Device that is devices that do not have basic 'Turn On' 'Turn Off' functionality, e.g. an alarm. For illustrative purposes an 'Alarm' type device 56 has been shown in FIG. 4 and understandably this 'Alarm' device does not want to implement the normal On/Off functions that devices that are derived from Basic Device must have; it therefore sits at the same top level 58 in the hierarchy as the Basic Device 54 itself.

A second extension to the hierarchy is also shown in FIG. 4 i.e. the Enhanced TV Device 66 below the normal TV Device 64. Here the Enhanced TV Device inherits all of the functionality of both the Basic Device 54 and the TV Device 64, but also includes some extended functionality that is not present in a normal TV. A regular TV remote control designed to operate a normal TV Device can operate the Enhanced TV Device to the level of a normal TV Device functionality, but can't control the extended functionality.

The HUCL protocol accordingly provides an extensible mechanism for describing the Device Type and the devices above it from which it inherits functionality. Whilst the idea of a hierarchy of many layers might seem appealing, extending it beyond three or four levels will start to impact the size of the Simple Device Description.

Within HUCL it is possible to request a device description from a controller as well as a controllable device. When one device sends the "Get Simple Description" to a controller device (e.g. a switch) it is returned a Simple Device Description that contains a Device Type of "Controller". The controller device may also make available an Extended Device Description which provides further information such as the manufacturer, model number etc.

It is important to note that the Device Type returned by a controller device is simply "Controller" 52 there is no hierarchy of different controller type devices defined in the device type tree. The reason for this is again trying to keep the protocol and messages sizes small and simple. It might be felt that it would be possible to have different controller types derived from the basic Controller such as a Switch, TV Remote Control, PVR Remote Control, etc. However a problem would occur with intelligent controllers such as Universal Remote Controller that are capable of controlling a wide range of devices. To include all of the possible controller types in a simple device description would result in a potentially large message, which goes against the ideal of trying to make the initial Simple Device Description simple. To determine the exact capabilities of a controller device different mechanisms are employed.

The first means of determining the capabilities of a controller device is by the Extended Device Description which is permitted on a controller device and may contain information such as the device name e.g. "Universal Remote Control" and whilst this is textual information and is not directly interpretable by application software, it can be presented to the user to assist in making an informed choice about a controller.

The second means for a device to determine more about a controller is by querying it.

The use of querying is a powerful mechanism for drip-feeding information about a device that would otherwise, if supplied en-mass, overload the requester.

Figure 5:
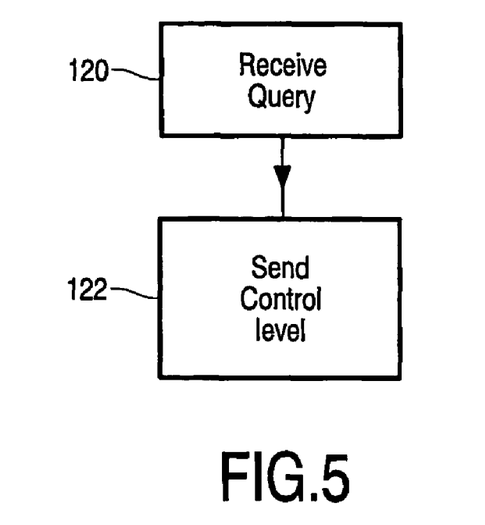
FIG. 5 shows the steps that a controller carries out to inform a controlled device of its control capability of that device.

Each device of controller type provides a means for other devices to query 120 whether it is able to control a specific Device Type (FIG. 5). The device type passed in the query is the same field as is used in the Simple Device Description i.e. as defined in the Device Type Hierarchy. The controller returns 122 the level to which it can control the device, by returning the lowest device type in a list stored in the controller memory 14 that is the device type passed in the query or from which that device type depends. For example, a simple switch is queried whether it can control an Enhanced TV Device. Based on the hierarchy illustrated in FIG. 4 above the reply is that it can control it to the level of Basic Device. The switch would typically itself know nothing about a device type of Enhanced TV Device, but since the Device Type also includes the inherited devices it would be able to identify the Basic Device and return this as the lowest hierarchically superior device type it is capable of controlling.

Figure 6:
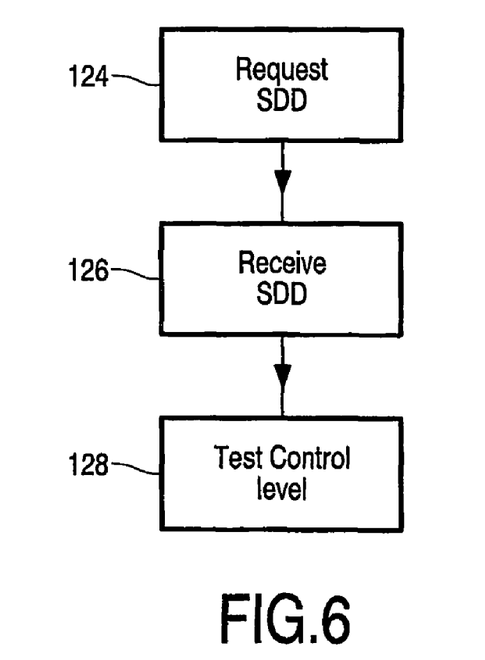
FIG. 6 shows the steps that a controller carriers out to determine its control capability of a controlled device.

The controller also implements an algorithm to determine if the switch can control a device type that is returned to it in a Simple Device Description (FIG. 6). When a switch discovers the address of a device it asks 124 the device for its simple device description, on receiving this information 126 the switch tests 128 whether it can control a device of this type to any degree, which is the same question it needs to respond to as a result of the querying process 120. The result is that the two query processes 120, 122, 124, 126, 128 do not add too much to the complexity of the simple switch device. The same applies to other simple devices.

It can be foreseen that there will be instances where a device may be a composition of a number of discrete devices all accessed via the same physical address e.g. all co-located on a single RF transceiver.

Examples of this type of device are a bank of individually switchable lights controlled through a single RF transceiver, or a TV with integrated alarm clock where both components are remotely controllable again through the same transceiver.

Figure 7:
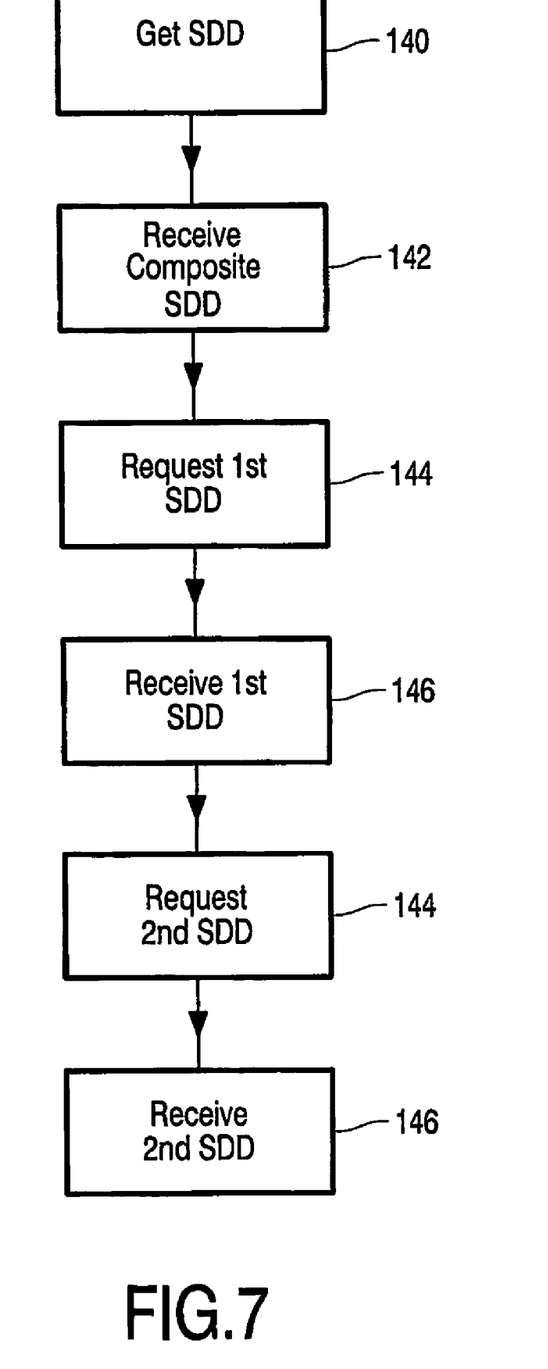
FIG. 7 is a flow diagram of the device discovery process for a composite device.

FIG. 7 illustrates the discovery process. The switch initially obtains the addresses of all devices known by the underlying transport medium, this includes the single address of the four individually controllable lights. The switch issues 140 a Get Simple Description command to the light bank, and the question that arises is what should the reply be? If four device descriptions are returned then this would be four times as much data than the switch would be expecting to receive. Returning multiple Simple Device Descriptions is not very scalable, and would, for example cause problems if there were 20 lights in the lighting bank.

The solution for this provided by HUCL is a specific Device Type for composite devices.

The composite device returns 142 its Simple Device Description including in the Device Type field 232 its device type as a "Composite Device". The Simple Device Description also identifies in field 234 that there are, in this example, four embedded devices within this single device.

The next stage, once the controller has identified that it is communicating with a composite device, is for it to establish what devices are embedded within it. The controller makes 144 further Get Simple Description requests to the composite device but addressing the requests to the specific embedded devices. The embedded devices return 146 their device descriptions.

Once the controller decides that it is going to control one of the embedded devices, all control commands are directed at the specific embedded device by including an embedded device ID with each command. Once the concept of the composite device has been established it opens up the possibility for a number of interesting device combinations that would be of benefit, some of these will be discussed below.

An example is a single device that consists of a lamp with integral switch, where the functionality of switch is exposed so as to be able to control other devices. This device, when queried for its Simple Device Description exhibits itself as a composite device, but when queried further one embedded device would be found to be a controller, and the other a controllable i.e. a Light Device. A number of such devices could be configured in such a way that operating the switch on any one of the devices causes the lights to be turned On/Off on all the devices e.g. turning on any one table lamp in the lounge causes all the table lamps in the lounge to come on.

Other possible combinations of composite device within the CE domain include for example a TV+video cassette recorder (VCR) or DVD and VCR. Each of these could if required describe itself as a composite of two devices.

Figure 8:
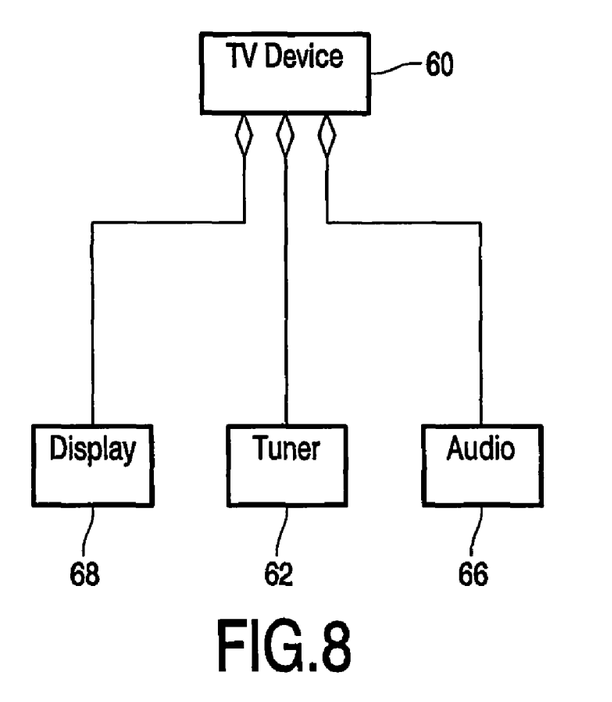
FIG. 8 illustrates an embodiment of a composite device.

Conceptually a Device consists of the core device plus zero or more sub-components, e.g. a TV Device 60 may for example consist of the TV Device 60 itself plus Tuner 64, Audio 66 and Display 68 sub-components (see FIG. 8).

Figure 9:
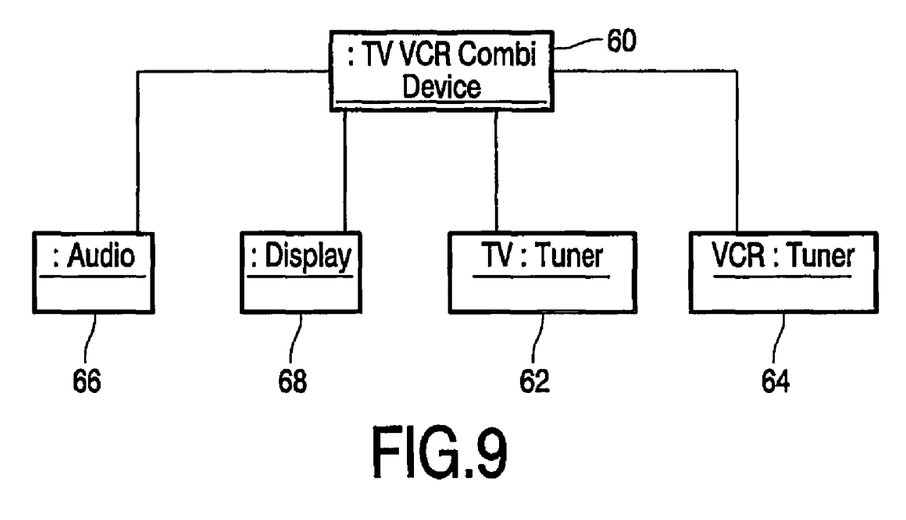
FIG. 9 illustrates another embodiment of a composite device.

It is also conceivable that a single device may have more than one instance of a sub-component e.g. a TV/VCR Combi Device may have two tuners 62, 64, one for the TV and one for the VCR (see FIG. 9), as well as audio 66 and display 68 components.

It might be felt that the use of XML and its compression and de-compression on the simplest of devices is a little heavyweight. The use of XML to describe the protocol provides a solution that is easily extensible for future enhancements, relatively simple to describe and understand, can easily handle structured information and is instantly compatible with the 'internet domain'.

Using a tagged compression technique on the XML (defined within HUCL) takes the relatively verbose protocol back down in size towards that of a traditional pure binary-based protocol, with some additional overhead to retain the content structure.

If one were to be presented with the a command in its compressed form it can be read in a similar manner that one would read any other binary based protocol, using information on the command structure and a table of definitions for data values. The only hint that the binary data may have originated from an XML based notation would be the presence of data to represent structure.

The HUCL specification defines that the messages is always transmitted through the transport medium in its compressed form. However on a simple device the application may operate directly on compressed messages, so eliminating the need on that device for the presence of the compression/de-compression software within the HUCL Software Stack. In this case the application would store (as part of the application image in ROM) the simple device description in its pre-compressed form, it would have a parser for the compressed protocol messages that it receives which would be similar in nature to any other binary protocol parser; any response messages would also need to be stored in their compressed form.

Using this approach the simplest devices such as the light switch and light fitting example used throughout this section can be implemented with a reduced software stack, and given that the number of commands that a simple device would need to understand and send is relatively small (turn light on, turn light off, toggle, get current state, get device description etc.) the overhead on the application software is minimal.

This offers a scalable solution to devices, where it is practical to implement the application to operate on compressed data this can be done, but when the device becomes more complex there will be a point where it becomes easier to include the compression/de-compression functionality in the stack and have the application use the protocol messages in their full XML notation. This cut off point is entirely down to the device designer and not defined or dictated by HUCL at all.

Figure 10:
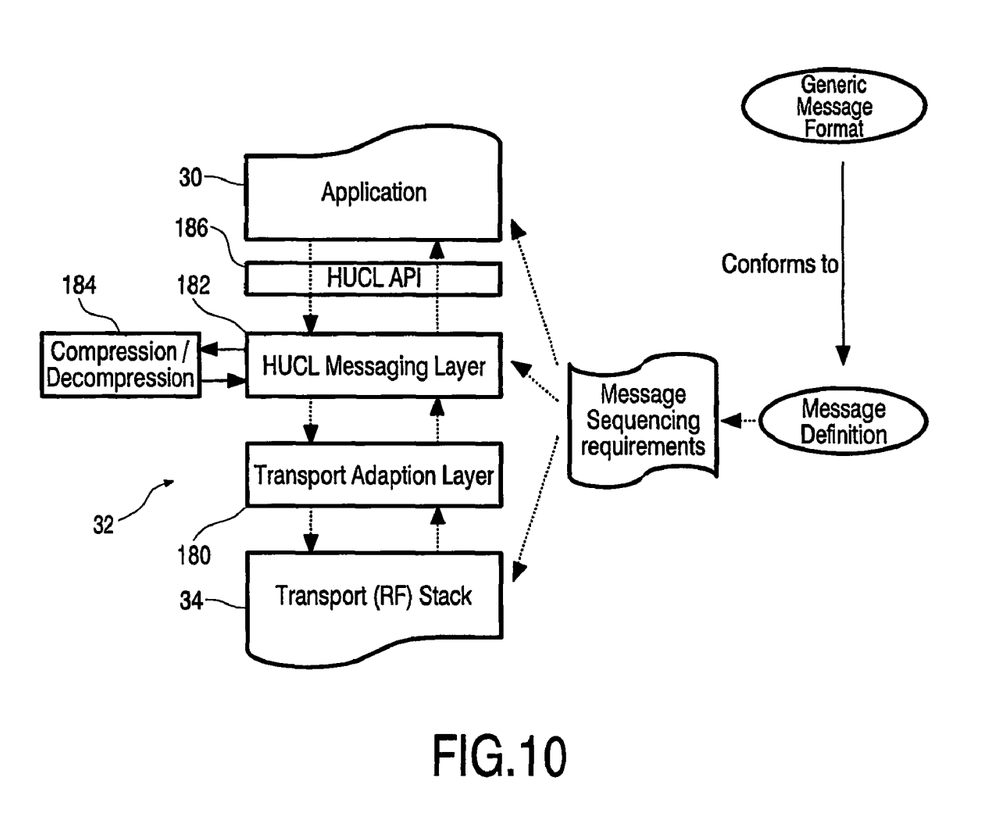
FIG. 10 shows the structure of the software.

FIG. 10 illustrates how the components that make up HUCL fit together. It will be appreciated that the components are software components recorded in memory.

The following sections discuss in more detail the layers that form the HUCL software stack 32 and the functionality that they provide.

As has been stated earlier HUCL does not rely on a specific transport protocol (unlike for example TCP/IP) but instead sits directly on top of a transport stack 34. Different transport stacks 34 will by their nature offer differing services to applications and through differing API's; the HUCL Transport Adaption Layer 180 acts as a buffer to the specific transport layer.

The Transport Adaption Layer 180 provides to the higher layers in the HUCL stack a consistent transport independent set of services. The requirements of this layer are defined in detail in the Protocol Specification.

The messaging layer 182 provides the bulk of the functionality of the HUCL Software Stack. Applications communicate with this layer through the HUCL API and it will perform the calls back in to the application when necessary (e.g. when data is received).

The messaging layer 182 also handles any initial error reporting and if necessary acknowledgements. Message ID's and Transaction ID's used to check for missing messages and for coupling messages to replies are also handled fully by this layer.

The Messaging layer 182 also makes use of the Compression/Decompression services 184 as and when a message needs to be compressed or decompressed. As discussed earlier an application deals exclusively with messages in their compressed form, no calls are made to these services and they can be removed from the runtime stack.

Quite simply the compression and decompression services provide the message layer with the means to convert the HUCL messages between their compressed and decompressed forms. It is possible for this component of the system to be absent in low-end devices where all data exchanges with the application are made with compressed messages.

The application programming interface API 186 is the interface through which all applications communicate with the HUCL software Stack. Communication is bi-directional in that the HUCL stack will make asynchronous calls back to the application as a result of certain events occurring in the lower layers e.g. message received via the transport stack.

HUCL is transport stack 34 independent, and what this means is that the HUCL messaging protocol can be built on top of a variety of transport stacks, both wired and wireless.

Since HUCL is designed as a lightweight protocol it is therefore most suited to lightweight transport stacks as well such as the emerging Zigbee (802.15.4) standard, but it can sit equally well on top of TCP & UDP/IP which opens up a wide range of other protocols, both wired (e.g. Ethernet) and wireless (e.g. 802.11b).

For a HUCL to be implemented on a transport stack 34 it must be possible to provide a number of services to the messaging layer of the HUCL stack. This means that these services can either be present in the transport stack itself or it must be possible to implement any missing services in the Transport Abstraction Layer of the HUCL stack. These services may cover aspects such as addressing, message delivery and device discovery (e.g. discovering the addresses of other devices on the network).

Figure 11:
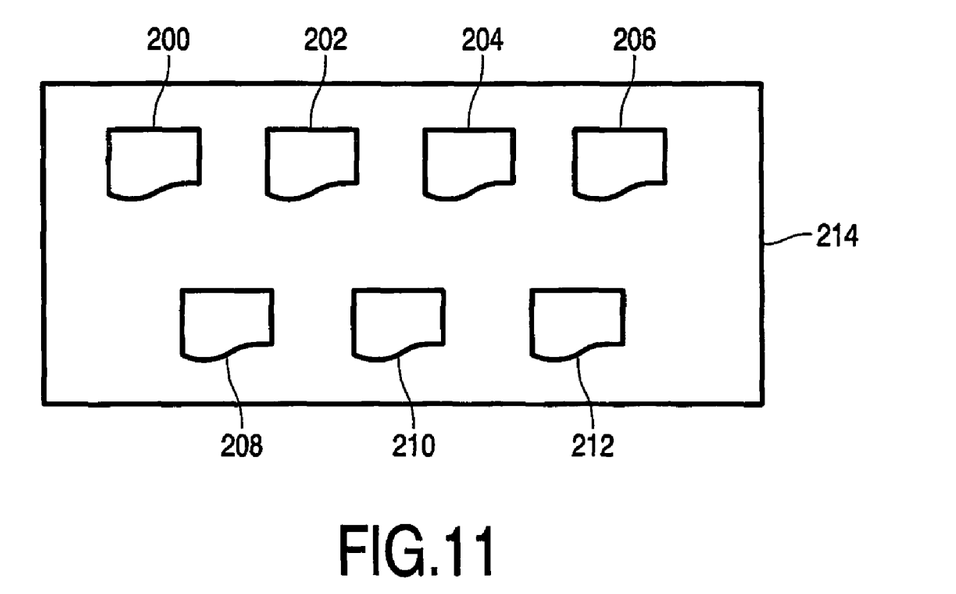
FIG. 11 illustrates the HUCL protocol.

The protocol itself is a document recorded on a medium 214, including the following information as shown in FIG. 11:

a generic HUCL message format 200 that defines the format to which all HUCL messages conform;

message definitions 202 defining the specific messages that form the control protocol.

message sequencing requirements 204 defining which messages are sent when, and the requirements of the application on receiving a message.

the HUCL API definition 206 defining the bi directional interface between HUCL and the application using it;

the messaging System requirements and functionality 208 of the HUCL software stack;

a compression algorithm 210 defining the mechanism for the compression of the HUCL messages, and a transport Adaption Layer definition 212 defining how the HUCL software stack is interfaced to a transport system (e.g. an RF stack).

HUCL is accordingly not simply a message format definition but also encapsulates a message interchange and compression. The later four items in the list above form the HUCL software stack that would be present in a device, the first three items define the requirements to which the stack and application must conform.

From reading the present disclosure, other variations and modifications will be apparent to persons skilled in the art. Such variations and modifications may involve equivalent and other features which are already known in the design, manufacture and use of networks and which may be used in addition to or instead of features described herein. Although claims have been formulated in this application to particular combinations of features, it should be understood that the scope of disclosure also includes any novel feature or any novel combination of features disclosed herein either explicitly or implicitly or any generalisation thereof, whether or not it mitigates any or all of the same technical problems as does the present invention. The applicants hereby give notice that new claims may be formulated to any such features and/or combinations of such features during the prosecution of the present application or of any further applications derived therefrom.

In particular, the specific subroutine names used in the examples may readily be varied. The computer program controlling the devices is shown as being recorded in memory 14 but the skilled person will realise that it could be recorded on many other types of record carrier such as a CD, floppy disc, etc.

Further, it will be noted that a very simple example of a light fitting and light switch has been extensively described in the forgoing. The skilled person will appreciate that many more complex control scenarios are also possible.

The invention claimed is:

1. A method of recognizing in a network a plurality of simple and complex devices, each including at least one of a plurality of device types and a simple device description, the method comprising acts of:
   a first device of the plurality of simple and complex devices discovering at least one other device of the plurality of simple and complex devices, the plurality of complex devices including an extended device description;
   the first device requesting a simple device description for each discovered device for which the simple device description is required and receiving from the discovered device a simple device description message of a defined length, the message including the device type of the discovered device, the device types forming a predetermined hierarchy including one or more subsidiary device types depending on at least one other subsidiary device type and at least one basic device type, devices having a hierarchically lower device type are capable of controlling devices having hierarchically higher device type; and
   the first device requesting an extended device description from each discovered device for which the extended device description is required when the simple device description indicates that the extended device description is available, and receiving from the discovered device the extended device description message of a variable length,
   wherein the simple device description message is in the form of a token-compressed message compressed from a human-readable message format, each of the subsidiary device types inheriting properties of higher level device types on which the subsidiary device type depends.

2. The method according to claim 1, further comprising an act of establishing the network address of the discovered device before the act of sending a simple device description to the discovered device.

3. The method according to claim 1, wherein the first device is a controller type device comprising a list of the device types of the one or more discovered devices that the controller can control.

4. The method according to claim 3, further comprising an act of determining the lowest level device type of the device type of the discovered device or the device type from which the device type of the discovered device depends, and the extent to which the first device can control the discovered device.

5. The method according to claim 4, wherein the requested device type is provided to request whether the first device is able to control a device of the requested device type; and a device type in the extended device description message representing the lowest level of device type that is the requested device type or is a higher level device type from which the requested device type depends.

6. The method according to claim 2, wherein the predetermined device type hierarchy further includes a composite device type, and the first device is of the composite device type having the functionality of an integer number of other devices, and the simple device description message including the device type representing the discovered device as a composite device and the integer number of other devices is the number of the subsidiary device types.

7. A method of recognizing a plurality of simple and complex devices in a network, the method comprising acts of:
   at a first device of the plurality of simple and complex devices:
   receiving a simple device description message of a defined length, the message including a device type of a second device of the plurality of simple and complex devices, the device types forming a predetermined hierarchy including one or more subsidiary device types depending on at least one of other subsidiary device type and at least one basic device type, devices having a hierarchically lower device type are capable of controlling devices having hierarchically higher device type, the simple device description message is in the form of a token-compressed message compressed from a human-readable message format, each of the subsidiary device types inheriting properties of higher level device types on which the subsidiary device type depends;
   receiving an extended device description from each of the plurality of devices for which the extended device description is available and the extended device description required,
   wherein the extended device description is received in a variable length message.

8. A plurality of simple and complex devices including a transceiver for sending and receiving messages and a message handler arranged in a communication network, a first device of the plurality of devices being configured to perform acts of:
   receiving from one of the plurality of devices, a simple device description message of a defined length, the message including a device type of the one device and indicating whether an extended device description is available, the device types forming a predetermined hierarchy including one or more subsidiary device types depending on at least one of other subsidiary device type and at least one basic device type, devices having a hierarchically lower device type are capable of controlling devices having hierarchically higher device type, wherein the simple device description message is in the form of a token-compressed message compressed from a human-readable message format, each of the subsidiary device types inheriting properties of higher level device types on which the subsidiary device type depends; and
   receiving an extended device description message of a variable length if the extended device description is available.

9. A first device, including a transceiver for sending and receiving messages and a message handler arranged in a communication network with a plurality of simple and complex devices, the first device being configured to perform acts of:

discovering at least one of the plurality of devices;

for each discovered device for which the simple device description is required, requesting a simple device description and receiving from the at least one of the plurality of devices, a simple device description message of fixed length including the device type of the at least one of the plurality of devices and indicating whether an extended device description is available, the device types forming a predetermined hierarchy including one or more subsidiary device types depending on at least one of other subsidiary device type and at least one basic device type, devices having a hierarchically lower device type are capable of controlling devices having hierarchically higher device type; and testing the simple device description message to determine whether an extended device description is available for each device for which the extended device description is required, requesting an extended device description when the testing of the simple device description message indicates that there is an extended device description, and receiving from the at least one of the plurality of devices the extended device description of variable length, wherein the simple device description message is in the form of a token-compressed message compressed from a human-readable message format, each of the subsidiary device types inheriting properties of higher level device types on which the subsidiary device type depends.

10. The first device according to claim 9, wherein the first device is the controller device type and comprises a list of device types that can be controlled by the first device, and further comprising an act of determining a lowest level device type of the device type of the at least one of the plurality of devices or the device type from which the device type of the at least one of the plurality of devices depends and the extent to which the first device can control the at least one device of the plurality of devices.

11. The networked device according to claim 10, wherein the message handler is arranged:

to receive a request from a third device including a device type value inquiring whether the first device is able to control a device of a device type of the third device; and to respond with a message including a device type representing the lowest level of device type in the list of device types that either is the third device type or is a higher level device type from which the third device type depends.

12. A system comprising:

a plurality of networked simple and complex devices each having a transceiver for sending and receiving network messages;

at least one networked device of the plurality of networked simple and complex devices is arranged to request, receive, and interpret simple device description messages from the other devices of the plurality of networked simple and complex devices, and to request, receive, and interpret extended device description messages subsequently received from the complex devices;

each of the networked simple and complex devices being arranged to respond to an incoming simple device request by sending a simple device description message of defined length including a device type of the responding other device and indicating whether an extended device description is available, the device types forming a predetermined hierarchy including one or more subsidiary device types depending on at least one of another subsidiary device type and at least one basic device type, devices having a hierarchically lower device type are capable of controlling devices having hierarchically higher device type, wherein the simple device description message is in the form of a token-compressed message compressed from a human-readable message format, each of the subsidiary device types inheriting properties of higher level device types on which the subsidiary device type depends.

13. The system according to claim 12, wherein the plurality of networked devices includes at least one simple device without the capability to decompress messages and interpreting directly compressed messages and at least one complex device including a message decompression arrangement for decompressing the messages and a message interpreter for interpreting the decompressed messages.

14. The system according to claim 12, wherein the predetermined top level elements further include a composite device type; the system includes at least one networked device of the composite device type having the functionality of a predetermined number of other devices, the predetermined number being an integer greater than or equal to 2; and each of the at least one networked device of the composite device type responds to a request of a simple device description by sending a simple device description including the device type as a composite device and a sub-device number representing the predetermined number of other devices.

15. The method of claim 1, wherein the method acts are encoded in a computer program for controlling a networked device, the computer program being arranged to cause the networked device to carry out the acts of the method.

16. The method according to claim 15, wherein the computer program is recorded on a non-transitory data carrier.

\* \* \* \* \*